(No Model.)

J. P. JOHNSON.
WAGON GEAR.

No. 364,654. Patented June 14, 1887.

Attest:
John Schuman

Inventor:
Jeremiah P. Johnson.
by his Att'y

UNITED STATES PATENT OFFICE.

JEREMIAH P. JOHNSON, OF DETROIT, MICHIGAN.

WAGON-GEAR.

SPECIFICATION forming part of Letters Patent No. 364,654, dated June 14, 1887.

Application filed March 25, 1886. Renewed January 3, 1887. Serial No. 223,275. (No model.)

*To all whom it may concern:*

Be it known that I, JEREMIAH P. JOHNSON, of Detroit, in the county of Wayne and State of Michigan, have invented new and useful Improvements in Wagon-Gear; and I do hereby declare that the following is a full, clear, and exact description thereof, reference being had to the accompanying drawings, which form a part of this specification.

This invention relates to certain new and useful improvements in wagon-gear, and is especially designed for application to that class of wagons that are mounted upon platform-springs; and the invention consists in the peculiar construction, arrangement, and combination of the various parts, all as more fully hereinafter set forth and claimed.

Figure 1:
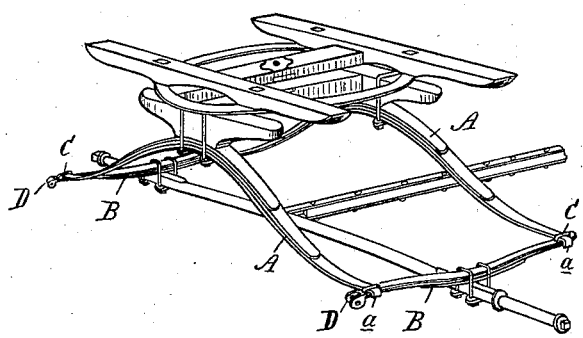
Figure 2:
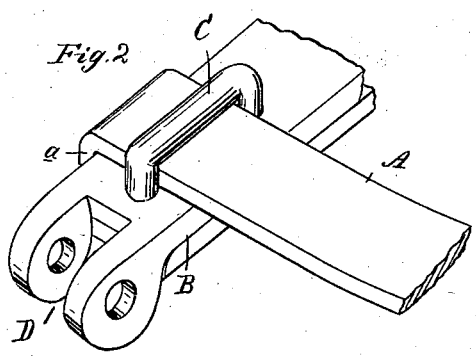

Figure 1 is a perspective view of a platform-gear embracing my improvements. Fig. 2 is a perspective of one corner of the platform, showing the manner in which the ends of the side and cross springs are secured together.

In the accompanying drawings, A represents the long or crossed springs, and B the side springs, of a platform-gear. Each end of the side springs, B, is provided with a clip, C, preferably made of round iron, and through which the ends of the springs A pass, as shown, the outer ends being bent downwardly at or nearly at a right angle, as shown, forming a flange, $a$.

To the forward ends of the side springs, B, I secure shackles D, which are designed to receive the eyes of the shaft or tongue. Preferably these shackles should be formed as an integral part of the main leaf of the side spring, although I do not desire to confine myself strictly to such construction, as it is evident that there are many ways in which a shackle could be rigidly secured to such spring.

It will be noticed that by securing the intersecting ends of platform-springs substantially by the means described and shown the longer or cross springs A are free to expand under the influence of a superimposed load by slipping beneath the clips without exerting any torsional strain upon the side springs, and that the side springs are prevented from springing outwardly by the flange $a$ upon the ends of the cross-bridge.

It will be observed that in providing the side springs with means for attaching the pole or tongue the draft is applied through the medium of the spring at the nearest point attainable to the shoulders of the axle.

I am aware of the Patents Nos. 302,838 and 330,405, and make no claim to the construction shown therein as forming part of my invention. I deem it important that the ends of the springs A pass loosely between the clips C and the top of the side springs, B, whereby the springs A are free to expand under the influence of a superimposed load without exerting any torsional strain on the springs B. The flanges $a$ prevent the displacement of the springs longitudinally, and the clips C prevent lateral displacement.

I also disclaim the construction shown in the Patent No. 167,991. I deem it important that the shackles be secured to the springs B near the clips C, whereby I combine the advantages of applying the draft through the medium of the spring at a point near the shoulders of the axle and those attained by the loose connection between the springs A and B.

What I claim as my invention is—

The combination, with the spring B, provided with the clip C, and having formed integral therewith the shackles D in proximity to said clip, of the spring A, passed loosely through said clip and having its end bent to form the flange $a$, substantially as and for the purpose specified.

JEREMIAH P. JOHNSON.

Witnesses:
H. S. SPRAGUE,
CHAS. THURMAN.